June 14, 1927.
F. C. SIMMS
1,632,319
METHOD OF MAKING CERAMIC MEMBERS
Filed Nov. 18, 1925
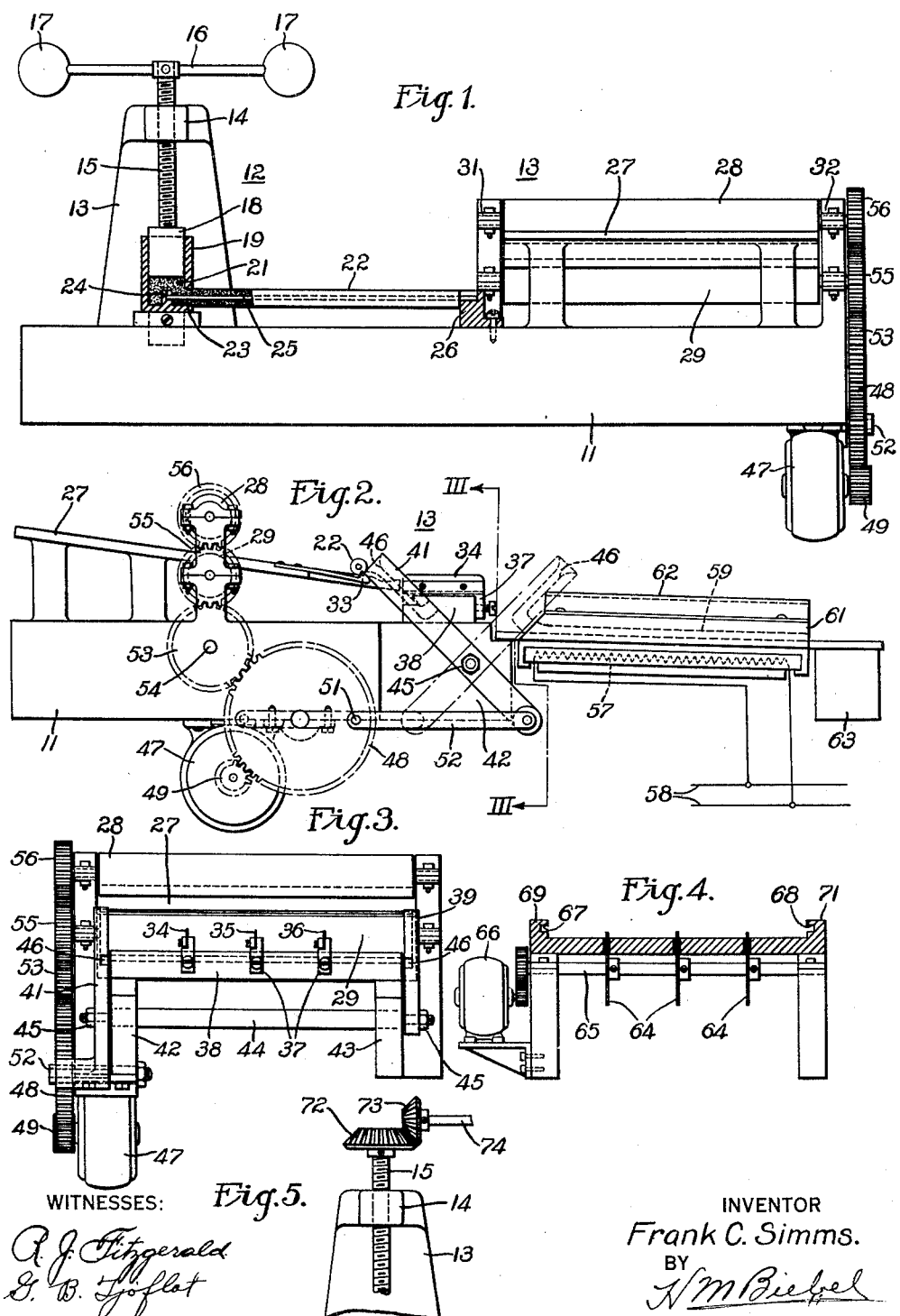
INVENTOR
Frank C. Simms.

Patented June 14, 1927.

1,632,319

UNITED STATES PATENT OFFICE.

FRANK C. SIMMS, OF EAST PALESTINE, OHIO.

METHOD OF MAKING CERAMIC MEMBERS.

Application filed November 18, 1925. Serial No. 69,766.

My invention relates to ceramic materials, and particularly to methods of making ceramic products.

An object of my invention is to provide a method for quickly making ceramic tubes and rods.

Another object is to provide a relatively simple device for practicing my improved method.

In practicing my invention, I extrude a tube of ceramic material from a semi-moist dust on a rod, roll the external surface thereof to smooth the same, cut the tube into shorter pieces, dry the same at relatively high temperature while still on the rod, and then fire the same after the shorter tubes have been removed from the rod. Ceramic members, of rod form or of some other shape in lateral section that can be extruded, are extruded in substantially the same manner of semi-moist dust and are associated with an elongated member to restrain the extruded ceramic product during the quick drying process. Thus if a rod is extruded it may be placed within a tubular member. If a member of say channel section is extruded, it may have placed thereagainst a bar to restrain the ceramic member.

In the single sheet of drawings,

Figure 1 is a view, in end elevation, of a device employed in practicing my invention, portions of the device being shown in section, Fig. 2 is a view, in side elevation, of the device shown in Fig. 1, Fig. 3 is a view, in lateral section therethrough, taken on the line III—III of Fig. 2, Fig. 4 is a view, partially in end elevation and partially in lateral section, of a modified form of device employed in practicing my invention, and, Fig. 5 is a fragmentary view of a modified form of device employed in practicing my invention.

Referring more particularly to Fig. 1 of the drawings, I have there illustrated a work table 11 upon which a press 12 and a device 13 for practicing the method embodying my invention may be mounted. Any suitable or desired construction of the table 11 may be employed, and as it forms no part of my invention proper, it is not illustrated in detail.

While my improved process can be employed for extruding a variety of products, I have elected to illustrate and describe apparatus particularly adapted for extruding tubes.

I have illustrated a conventional form of ceramic press 12 as comprising side members 13 having their lower ends properly secured to the table 11 and embodying a cross member 14 that has a threaded opening extending vertically therethrough within which there is located a screw threaded shaft 15 that is provided, at its upper end, with an actuating means comprising a bar 16 having weight members 17 secured to the ends thereof. The lower end of the shaft 15 fits into a plunger 18, that is adapted to move up and down in a suitable press cylinder 19. The cylinder 19 is filled with a mass of initially semi-moist dust 21 by raising the plunger or die 18 vertically upward to permit of placing a quantity of the semi-moist ceramic dust within the cylinder 19.

As it is intended that a relatively long tubular member 22 be extruded from the cylinder 19 through an opening 23 provided in the side thereof, I provide an abutment or support 24 within the cylinder 19 to serve as a means for supporting one end of a rod 25, the outer end of which is suitably secured in a member 26, which member may either be a part of a device to be hereinafter described in detail, or it may be a supporting member designed and located for that particular purpose. While I have illustrated an extrusion press in which the material is extruded laterally of the direction of travel of the piston or plunger in the cylinder, I do not desire to be limited thereto, as any other of the known forms of extrusion presses may be employed.

An inclined plane surface 27 is supported above the table 11, and is provided, intermediate its ends, with a pair of suitable cooperating rollers 28 and 29, that are mounted on suitable shafts supported in bearing members 31 and 32, respectively. The distance between the rollers 28 and 29 is the same as the external diameter of the particular tubular member 22 that is being extruded. A resiliently mounted hook member 33 is provided at each side of the plane surface 27 at the lower end thereof, and is normally in such position that the projecting ends of the rod 25, rolling down the plane 27, will engage the hook member 25 to hold the extruded tubular member and rod from rolling off the surface 27.

A plurality of spaced knife edges 34, 35, and 36 are mounted in metal members 37, of substantially C-shape, that are secured on a block 38 that is suitably mounted on the work table 11. While I have shown three knife edges, any desired number thereof may be used. Means for moving the successive tubular members 22 and the rods 25 over the cutting edges or knives comprises a pair of bars 39 and 41 that are pivotally mounted on suitable supports 42 and 43, being secured to a shaft 44 by means of nuts 45, in order that the two bars 41 and 39 may always be in co-operating and alined positions on the shaft 44. Each of the bars 39 and 41 is provided with a groove 46, of substantially L-shape, in the inner opposing faces and at the upper ends thereof, in substantially the manner shown more particularly in Fig. 2 of the drawings. The upper end of the groove 46 is widened for a purpose to be hereinafter set forth in detail.

Means for effecting a reciprocal movement of the two bars 39 and 41 on their pivotal support comprises a motor 47, that may be secured to the under surface of the work table 11 and that drives a crank disc 48, which is provided with gear teeth in its periphery, that are adapted to mesh with the teeth on a motor pinion 49. A crank pin 51 is provided on the disc or wheel 48 and has pivotally mounted thereon a connecting rod 52, the other end of which is pivotally connected to the lower end of one of the side bars 41.

The gear teeth on the wheel or disc 48 engage with the teeth on an intermediate gear wheel 53, suitably mounted on a shaft 54, which gear wheel meshes with a pinion 55 that is mounted on the same shaft as supports the roller 29. A gear wheel or pinion 56 is mounted on the same shaft as supports the roller 28, the pinions 55 and 56 co-operating to cause proper rotative movement of the two rollers.

A dryer attachment is located immediately beyond the cutting edges or knives 34 to 36 inclusive and comprises a suitable heating element 57 that is energized from a suitable source of supply 58, of electric energy. The projecting ends of the rod 25 are adapted to roll in grooves 59 that are located in suitable side members 61, only one of which is shown in Fig. 2 of the drawings. A cover member 62 is located above the side members, so that the tubular members 22 may be effectively subjected to the heat from the heating element 57. A means for receiving and temporarily holding the dried tubular members is provided at 63, and may be of any suitable or desired construction.

Fig. 4 illustrates a modified form of a cutting means, comprising a plurality of saws 64 that are located in spaced relation on a shaft 65. The shaft 65 is driven by a suitable motor 66 through a train of gear wheels. The projecting ends of the rod 25 are adapted to fit into grooves 67 and 68 in side members 69 and 71, the relative locations of the grooves and the saws being such that the saws will just cut the ceramic tube neatly and cleanly.

Fig. 5 illustrates a modified form of plunger press in that the upper end of the shaft 15 is provided with a bevel gear wheel 72 that is engaged by a bevel pinion 73, that is in turn, mounted on a shaft 74 that may be actuated by any means such as an electric motor or a belt.

It has heretofore been thought necessary to extrude ceramic tubes, particularly those of relatively small size and having a relatively thin wall, from a plastic form of ceramic material usually called clay. This material is substantially of the consistency of thick cream, that is, the amount of water contained therein is relatively large. The tubes extruded from this material were made of the desired length, and were then laid aside on a suitable surface to permit of their becoming dry enough for further handling. As the material was quite thin, the extruding force was not great, and the strength of the tube was relatively small, that is the material was not compacted to any great extent. After the water had been evaporated, the tube was relatively porous and had relatively little strength. By reason of their being located on a plane supporting surface, they would tend to warp during the drying operation, and would have to be handled and rolled to effect straightening thereof. The operation of extrusion itself resulted in the material being caused to flow in various directions, which also tended to result in warping of the tube during the drying operation.

In contradistinction to the use of clay when extruding ceramic tubes, I employ a semi-moist or semi-dry dust of the kind that is usually employed in molding ceramic material. I extrude the tubular member on a rod, that may be made of metal, and that is greased with a suitable lubricant to ensure the easy flow of the extruded material thereon, and that will also permit of the easy removal therefrom of the dried tubular member. After the tube 22 has been extruded as is shown in Fig. 1 of the drawing, it and the rod 25 are removed from the press and placed on the plane surface 27 at the left hand end thereof as seen in Fig. 2 of the drawings. The extruded tube 22 rolls down the plane surface, and between the two rotating rolls 28 and 29. If necessary, the tube 22 may be rolled on a suitable plane surface (not shown), or upon the surface 27 by the operator, the purpose of this rolling being to smooth the surface of the tubular member and to obtain a stronger tube. After passing between the rolls 28 and 29 the tubular member 22 will continue to roll down the surface 27 toward the right, until caught by the hook members 33.

When the bars 39 and 41 have been so moved by the motor 47 that their upper ends are in the positions shown by the full lines in Fig. 2, the upper ends thereof engage the hook members 33 and press them downwardly, whereby the rod 25 is released from the hook members, and the ends thereof will move into the grooves 46 in the bars 39 and 41. Further movement of the bars 39 and 41 will now be toward the right so that the tubular members are caused to move over the knives 34, 35, and 36 which have been spaced as far apart as it is desired that the length of the finished tubes shall be. I have found that the weight of the extruded tube and of the rod is sufficient to cause the rod 25 to roll on the knife edges so that the ceramic material is neatly cut.

When the bars 39 and 41 have been moved so far to the right that the rod 25 drops off the knife edges, it will then drop farther down in the two grooves 46 against the laterally extending portion thereof. When the bars are in the position shown by the broken lines in Fig. 2, the rod 25 moves out of the groove 46 and into the grooves provided in the side members hereinbefore described. These side members, and more particularly the grooves therein, slope downwardly to a slight extent so that the tube will travel through the dryer unit in such time as will permit of thoroughly drying the same in the relatively high temperature provided by the heating element 57. In general, I have found that a tube approximately one half inch in external diameter, and having a radial thickness of wall of about three thirty-seconds inch, can be dryed in about five minutes. After this drying, which it is to be noted is done while the tubular member is still on the rod, and therefore under restraint, the relatively short tubes may be stripped or removed from the rod, after which they are ready for firing. This firing is done in any manner well known in the art.

Instead of employing fixed knife edges over which the tubular member on the rod may roll in order to cut the extended tubular member into shorter lengths, I may employ the device illustrated in Fig. 4 wherein a plurality of rotating circular saws are used. In all other respects, however, the method is the same as hereinbefore described.

While I have illustrated a motor driven device, that is substantially automatic in its operation after the extruded tube has been placed on the surface 27, I do not desire to be limited to such an automatic method, as the method embodying my invention may be practiced by an operator effecting the operation of the bars 39 and 41 by hand.

As hereinbefore noted, it has been thought necessary to extrude each short tube length by itself through a suitable die, using slip or plastic ceramic material, then drying the tubes slowly with the attendant rehandling thereof.

My method uses a semi-moist dust of the kind usually employed in molding ceramic material in a press between dies. A relatively higher pressure is employed to effect extrusion and the resulting tube or other member is much more solid than those extruded from plastic ceramic material. The amount of water in the extruded member is very small and hence the extruded member is initially much more solid and stronger than heretofore. Such an extruded member can be handled without danger of distorting or breaking it, and but a relatively short time is required for drying the same.

Whereas ceramic members extruded from plastic material required very slow drying at room temperature in order to ensure that they would not be distorted, I am enabled to dry ceramic products made by my process at high temperature in a very short time, on the order of five minutes. This I attribute to the small amount of water in the extruded member as well as to the fact that the member is dried while under restraint laterally thereof over its entire length, so that a relatively high temperature can be used.

While I have described my improved process as applied to rods, members of any shape that can be extruded, can be made by this process, suitable restraining means being applied thereto after extrusion and during the step of quick drying the member.

Various modifications may be made in the method embodying my invention, without departing from the spirit and scope thereof, and all such modifications are intended to be covered by the appended claims, which are to be limited only by the prior art.

I claim as my invention:—

1. In a method of making ceramic members, the steps comprising extruding a member of initially semi-moist dust, placing said member under restraint laterally thereof, and quickly drying said member while under restraint.

2. In a method of making ceramic members, the steps comprising extruding initially semi-moist dust, placing said extruded material under restraint laterally thereof over its entire length, and quickly drying the same while under restraint.

3. In a method of making ceramic members, the steps comprising extruding initially semi-moist dust, placing said extruded material under restraint laterally thereof over its entire length, and drying the same at a relatively high temperature while still under restraint.

4. The method of preventing warping of ceramic members during manufacture, which comprises extruding semi-moist dust to the desired shape, placing the extruded member under restraint laterally thereof, and subjecting it to a relatively high temperature while under restraint.

5. The method of preventing warping of ceramic tubes during manufacture, which comprises extruding semi-moist dust in tubular form on a rod, and quickly drying the same while still on the rod.

6. In a method of making ceramic tubes, the steps comprising extruding a tube of initially semi-moist dust on a rod, rolling the tube, and then quickly drying the same while still on the rod.

7. The method of preventing warping of ceramic tubes during manufacture, which comprises the extrusion of semi-moist dust in tubular form on a rod, rolling the surface thereof, and quickly drying the same while still on the rod.

8. In a method of making a plurality of ceramic tubes, the steps comprising the extrusion of semi-moist dust in long tubular form on a rod, rolling the surface thereof, cutting the tube into predetermined lengths, and quickly drying the same at a relatively high temperature while still on the rod.

9. The method of preventing warping of ceramic tubes during manufacture, which comprises extruding a tube of initially semi-moist dust, and then subjecting it to a high temperature to quickly dry the same, the tube being subjected to a straightening force during the extruding and the drying operations.

10. The method of making ceramic tubes which comprises extruding a tube of initially semi-moist dust on a rod, rolling the same, immediately drying the same at a relatively high temperature, removing the same from the rod, and then firing the same.

11. The method of making a plurality of ceramic tubes simultaneously, which comprises extruding a mass of initially semi-moist dust in the shape of a long tube on a rod, rolling the surface thereof, cutting the long tube into shorter predetermined lengths, immediately subjecting it to a relatively high-temperature drying operation, removing the tubes from the rod, and then firing the same to harden them.

In testimony whereof, I have hereunto subscribed my name this 16 day of November, 1925.

FRANK C. SIMMS.